United States Patent
Vudathu et al.

(10) Patent No.: US 12,511,697 B2
(45) Date of Patent: Dec. 30, 2025

(54) SYSTEMS AND METHODS FOR DISTRIBUTED LEDGER-BASED CHECK VERIFICATION

(71) Applicant: JPMORGAN CHASE BANK, N.A., New York, NY (US)

(72) Inventors: Raghu Vudathu, Downingtown, PA (US); Christy Lillie, Ann Arbor, MI (US); Bodhi Hwang, Forest Hills, NY (US); Mark Lanter, Woodside, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 166 days.

(21) Appl. No.: 17/664,295

(22) Filed: May 20, 2022

(65) Prior Publication Data

US 2023/0377055 A1 Nov. 23, 2023

(51) Int. Cl.
*G06Q 40/12* (2023.01)
*G06Q 40/02* (2023.01)
(Continued)

(52) U.S. Cl.
CPC ........... *G06Q 40/128* (2013.12); *G06Q 40/02* (2013.01); *G06V 30/1452* (2022.01);
(Continued)

(58) Field of Classification Search
CPC .... G06Q 40/128; G06Q 40/02; G06Q 20/389; G06Q 20/40; G06Q 20/042;
(Continued)

(56) References Cited

U.S. PATENT DOCUMENTS 10,423,938 B1\* 9/2019 Gaeta .................... G06Q 20/042
2014/0372266 A1\* 12/2014 Tatham ................ G06Q 20/042
705/45

(Continued)

OTHER PUBLICATIONS

Nasir, Adeel et al. Trends and Directions of Financial Technology (Fintech) in Society and Environment: a Bibliometric Study. Applied Sciences; Basel vol. 11, Iss. 21, 2021. (Year: 2021).\*

(Continued)

*Primary Examiner* — Fawaad Haider
(74) *Attorney, Agent, or Firm* — GREENBERG TRAURIG LLP

(57) ABSTRACT

Systems and methods for distributed ledger-based check verification are disclosed. In one embodiment, a method may include a bank backend computer program: (1) receiving, from a computer application executed by an electronic device, an image of a presented check as part of an electronic check deposit process; (2) performing optical character recognition on the image of the presented check; (3) generating a text file based on the optical character recognition; (4) querying a distributed ledger in a distributed ledger network to determine whether the presented check has been presented or cleared before; (5) determining that the presented check has not been presented or cleared before; (6) processing the presented check for deposit; and (7) writing the text file for the presented check to the distributed ledger.

3 Claims, 3 Drawing Sheets

(51) Int. Cl.
*G06V 30/14* (2022.01)
*G06V 30/30* (2022.01)
*H04L 9/00* (2022.01)

(52) U.S. Cl.
CPC ............... *G06V 30/30* (2022.01); *H04L 9/50* (2022.05); *G06Q 2220/00* (2013.01)

(58) Field of Classification Search
CPC .......... G06Q 2220/00; G06V 30/1452; G06V 30/30; H04L 9/50
USPC ......................................................... 705/33
See application file for complete search history.

(56) References Cited

U.S. PATENT DOCUMENTS

| | | | |
|---|---|---|---|
| 2020/0082675 A1* | 3/2020 | Pratten | G07F 19/206 |
| 2020/0160286 A1* | 5/2020 | Vukich | G06Q 20/0425 |
| 2022/0058637 A1 | 2/2022 | Yan | |
| 2022/0253840 A1* | 8/2022 | Kolchin | G06Q 20/227 |

OTHER PUBLICATIONS

Zhang, Yingying et al. The Impact of Artificial Intelligence and Blockchain on the Accounting Profession. IEEE Access vol. 8. Jun. 8, 2020. (Year: 2020).*
International Search Report and Written Opinion, dated Jul. 13, 2023, from corresponding International Application No. PCT/US2023/067208.

* cited by examiner

SYSTEMS AND METHODS FOR DISTRIBUTED LEDGER-BASED CHECK VERIFICATION

BACKGROUND OF THE INVENTION

1. Field of the Invention

Embodiments generally relate to systems and methods for distributed ledger-based check verification.

2. Description of the Related Art

Image-based check deposit has made depositing checks easier, but it does come with drawbacks. For example, an unscrupulous user can image a check and present it to different financial institutions. The check can only be paid once, so the financial institution that accepted the check second may lose money.

SUMMARY OF THE INVENTION

Systems and methods for distributed ledger-based check verification are disclosed. In one embodiment, a method for distributed ledger-based check verification may include: (1) receiving, by a bank backend computer program and from a computer application executed by an electronic device, an image of a presented check as part of an electronic check deposit process; (2) performing, by the bank backend computer program, optical character recognition on the image of the presented check; (3) generating, by the bank backend computer program, a text file based on the optical character recognition; (4) querying, by the bank backend computer program, a distributed ledger in a distributed ledger network to determine whether the presented check has been presented or cleared before; (5) determining, by the bank backend computer program, that the presented check has not been presented or cleared before; (6) processing, by the bank backend computer program, the presented check for deposit; and (7) writing, by the bank backend computer program, the text file for the presented check to the distributed ledger.

In one embodiment, wherein the optical character recognition may recognize a routing number for the presented check, an account number for the presented check, and a check number in the image of the presented check.

In one embodiment, the bank backend computer program may identify one of a plurality of distributed ledgers to query based on the routing number of the presented check.

In one embodiment, the optical character recognition may recognize a date in the image of the presented check.

In one embodiment, the method may also include verifying, by the bank backend computer program, that the date is within a certain time period.

In one embodiment, the bank backend computer program may identify one of a plurality of distributed ledgers to query based on the date of the presented check.

In one embodiment, the text file for the presented check that is written to the distributed ledger may include metadata identifying clearing activity.

In one embodiment, the method may also include writing, by the bank backend computer program, the image of the presented check to the distributed ledger with a watermark, wherein the watermark comprises metadata identifying clearing activity.

In one embodiment, the distributed ledger network may include a plurality of banks, each bank maintaining a copy of the distributed ledger.

In one embodiment, the distributed ledger may include a blockchain-based distributed ledger.

According to another embodiment, a method for distributed ledger-based check verification may include: (1) receiving, by a bank backend computer program and from a computer application executed by an electronic device, an image of a presented check as part of an electronic check deposit process; (2) performing, by the bank backend computer program, optical character recognition on the image of the presented check; (3) generating, by the bank backend computer program, a text file based on the optical character recognition; (4) querying, by the bank backend computer program, a distributed ledger in a distributed ledger network to determine whether the presented check has been presented or cleared before; (5) determining, by the bank backend computer program, that the presented check has been presented or cleared before; and (6) rejecting, by the bank backend computer program, the electronic check deposit process.

In one embodiment, the optical character recognition may recognize a routing number for the presented check, an account number for the presented check, and a check number in the image of the presented check.

In one embodiment, the bank backend computer program may identify one of a plurality of distributed ledgers to query based on the routing number of the presented check.

In one embodiment, the optical character recognition may recognize a date in the image of the presented check.

In one embodiment, the method may also include verifying, by the bank backend computer program, that the date is within a certain time period.

In one embodiment, the bank backend computer program may identify one of a plurality of distributed ledgers to query based on the date of the presented check.

In one embodiment, the step of rejecting the electronic check deposit process may include notifying, by the bank backend computer program, the computer application of the rejection.

In one embodiment, the method may also include updating, by the bank backend computer program, a customer profile for the customer associated with the computer application based on the rejection.

In one embodiment, the method may also include restricting, by the bank backend computer program, electronic deposits from the computer application based on the rejection.

In one embodiment, the distributed ledger network may include a plurality of banks, each bank maintaining a copy of the distributed ledger.

According to another embodiment, a system may include a distributed ledger network having a plurality of bank backends participating therein, each bank backend executing a bank backend computer program, and an electronic device executing a computer application. The application may send one of the bank backend computer programs an image of a presented check as part of an electronic check deposit process. The bank backend computer program may receive the image, may perform optical character recognition on the image of the presented check, may generate a text file based on the optical character recognition, may query a distributed ledger in a distributed ledger network to determine whether the presented check has been presented or cleared before, may determine that the presented check has not been presented or cleared before, may process the presented check for deposit, and may write the text file for the presented check to the distributed ledger.

In one embodiment, wherein the optical character recognition may recognize a routing number for the presented check, an account number for the presented check, and a check number in the image of the presented check.

In one embodiment, the bank backend computer program may identify one of a plurality of distributed ledgers to query based on the routing number of the presented check.

In one embodiment, the optical character recognition may recognize a date in the image of the presented check.

In one embodiment, the bank backend computer program may also verify that the date is within a certain time period.

In one embodiment, the bank backend computer program may identify one of a plurality of distributed ledgers to query based on the date of the presented check.

In one embodiment, the text file for the presented check that is written to the distributed ledger may include metadata identifying clearing activity.

In one embodiment, the bank backend computer program may write the image of the presented check to the distributed ledger with a watermark, wherein the watermark comprises metadata identifying clearing activity.

In one embodiment, the distributed ledger network may include a plurality of banks, each bank maintaining a copy of the distributed ledger.

In one embodiment, the distributed ledger may include a blockchain-based distributed ledger.

According to another embodiment, a system may include a distributed ledger network having a plurality of bank backends participating therein, each bank backend executing a bank backend computer program, and an electronic device executing a computer application. The application may send one of the bank backend computer programs an image of a presented check as part of an electronic check deposit process. The bank backend computer program may receive the image, may perform optical character recognition on the image of the presented check, may perform optical character recognition on the image of the presented check, may generate a text file based on the optical character recognition, may query a distributed ledger in a distributed ledger network to determine whether the presented check has been presented or cleared before, may determine that the presented check has been presented or cleared before, and may reject the electronic check deposit process.

In one embodiment, the optical character recognition may recognize a routing number for the presented check, an account number for the presented check, and a check number in the image of the presented check.

In one embodiment, the bank backend computer program may identify one of a plurality of distributed ledgers to query based on the routing number of the presented check.

In one embodiment, the optical character recognition may recognize a date in the image of the presented check.

In one embodiment, the bank backend computer program may verify that the date is within a certain time period.

In one embodiment, the bank backend computer program may identify one of a plurality of distributed ledgers to query based on the date of the presented check.

In one embodiment, the bank backend computer program may notify the computer application of the rejection.

In one embodiment, the bank backend computer program may update a customer profile for the customer associated with the computer application based on the rejection.

In one embodiment, the bank backend computer program may restrict electronic deposits from the computer application based on the rejection.

In one embodiment, the distributed ledger network may include a plurality of banks, each bank maintaining a copy of the distributed ledger.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for distributed ledger-based check verification are disclosed.

Figure 1:
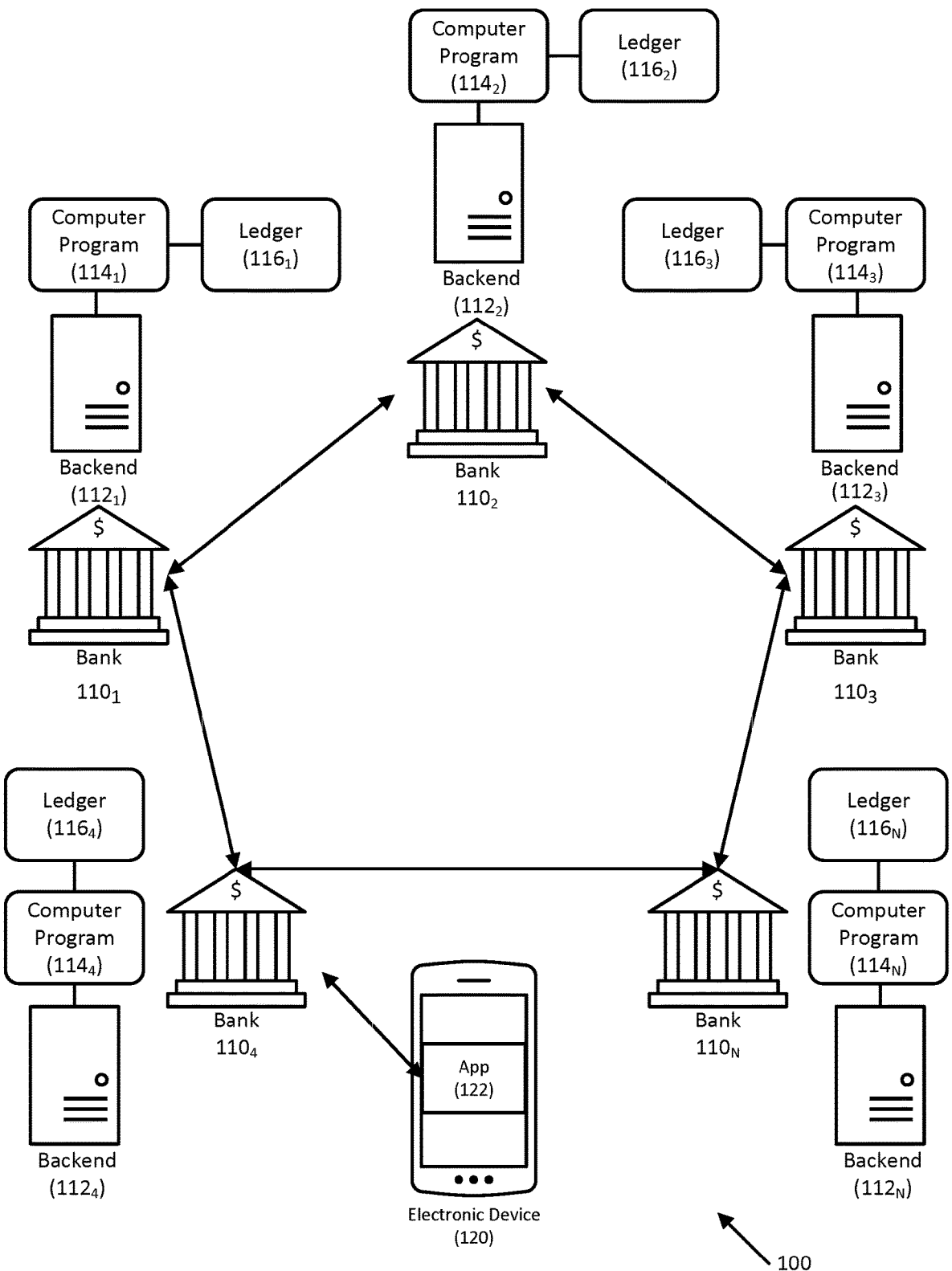
FIG. 1 discloses a system for distributed ledger-based check verification according to one embodiment.

Referring to FIG. 1, a system for distributed ledger-based check verification is disclosed according to one embodiment. System 100 may include a plurality of banks 110 (e.g., bank $110_1$, bank $110_2$, bank $110_3$, bank $110_4$, bank $110_N$). Banks 110 may be any suitable types of financial institutions on which checks may be drawn or presented.

Figure 3:
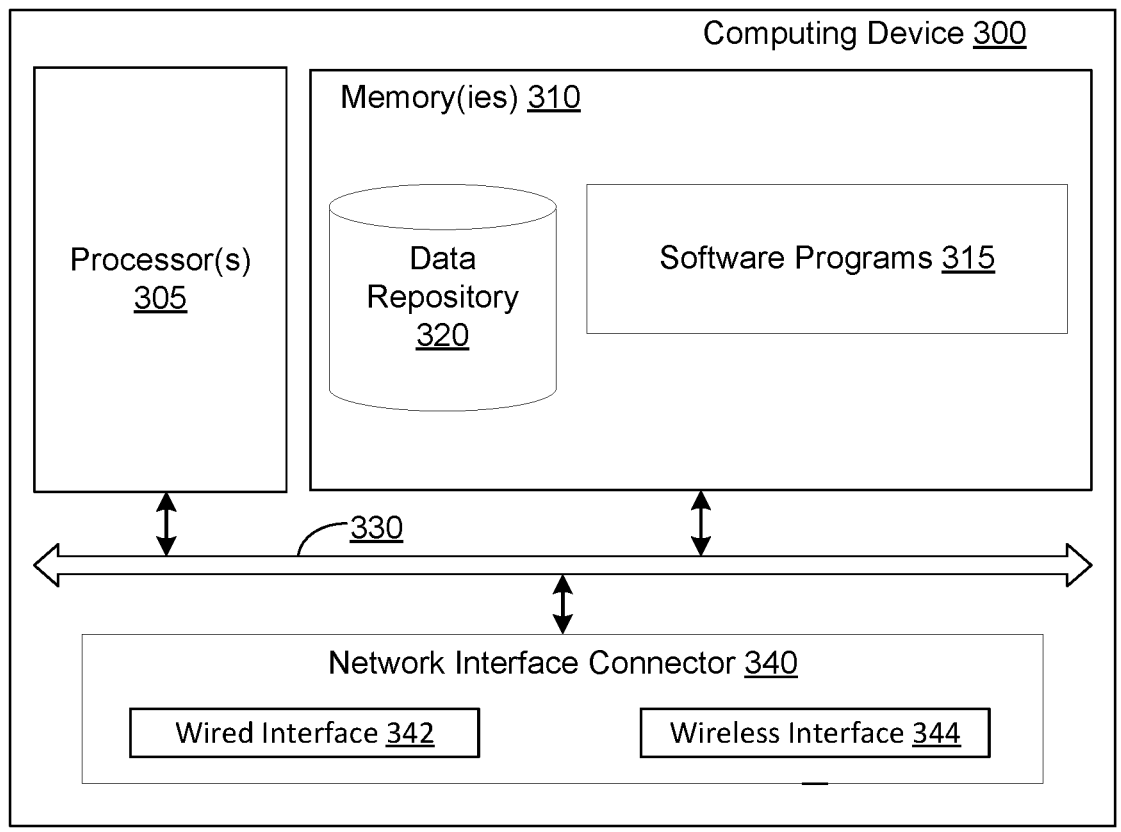
FIG. 3 depicts an exemplary computing system for implementing aspects of the present disclosure.

Each bank 110 may execute one or more computer programs include a backend (e.g., backend $112_1$, backend $112_2$, backend $112_3$, backend $112_4$, backend $112_N$) that may be any suitable computing device. An example of a suitable computing device is depicted in FIG. 3, below. Backends 112 may execute a computer program (e.g., computer program $114_1$, computer program $114_2$, computer program $114_3$, computer program $114_4$, computer program $114_N$). Each bank 110 may also participate as a node in a network, such as a distributed ledger network, in which a consensus algorithm may operate to write items, such as check presentations, check clearings, etc. to the distributed ledger. An example of a suitable distributed ledger is the Liink by J.P.Morgan$^{SM}$ network.

Each bank 110 may maintain its own copy of ledger 116 (e.g., ledger $116_1$, ledger $116_2$, ledger $116_3$, ledger $116_4$, ledger $116_N$).

In one embodiment, ledgers 116 may be blockchain technology-based ledgers.

In one embodiment, a plurality of ledgers 116 may be provided and may be date-based (e.g., separate ledgers 116 for a year, a month, or a day), may be based on the drawee bank (e.g., checks drawn on Bank $110_1$ have their own ledger, checks drawn on Bank $110_2$ have their own ledger, etc.), combinations (e.g., a year-based ledger for Bank $110_1$), etc.

System 100 may further include electronic device 120, which may be any suitable electronic device that may present an image of a check for processing. In one embodiment, electronic device 120 may be a smartphone, a computer (e.g., desktop, laptop, notebook, tablet, etc.), a kiosk, an ATM, etc. Electronic device 120 may execute application 122, which may be a computer program that may interface with one of backends 112. For example, application 122 may execute a check deposit process.

Figure 2:
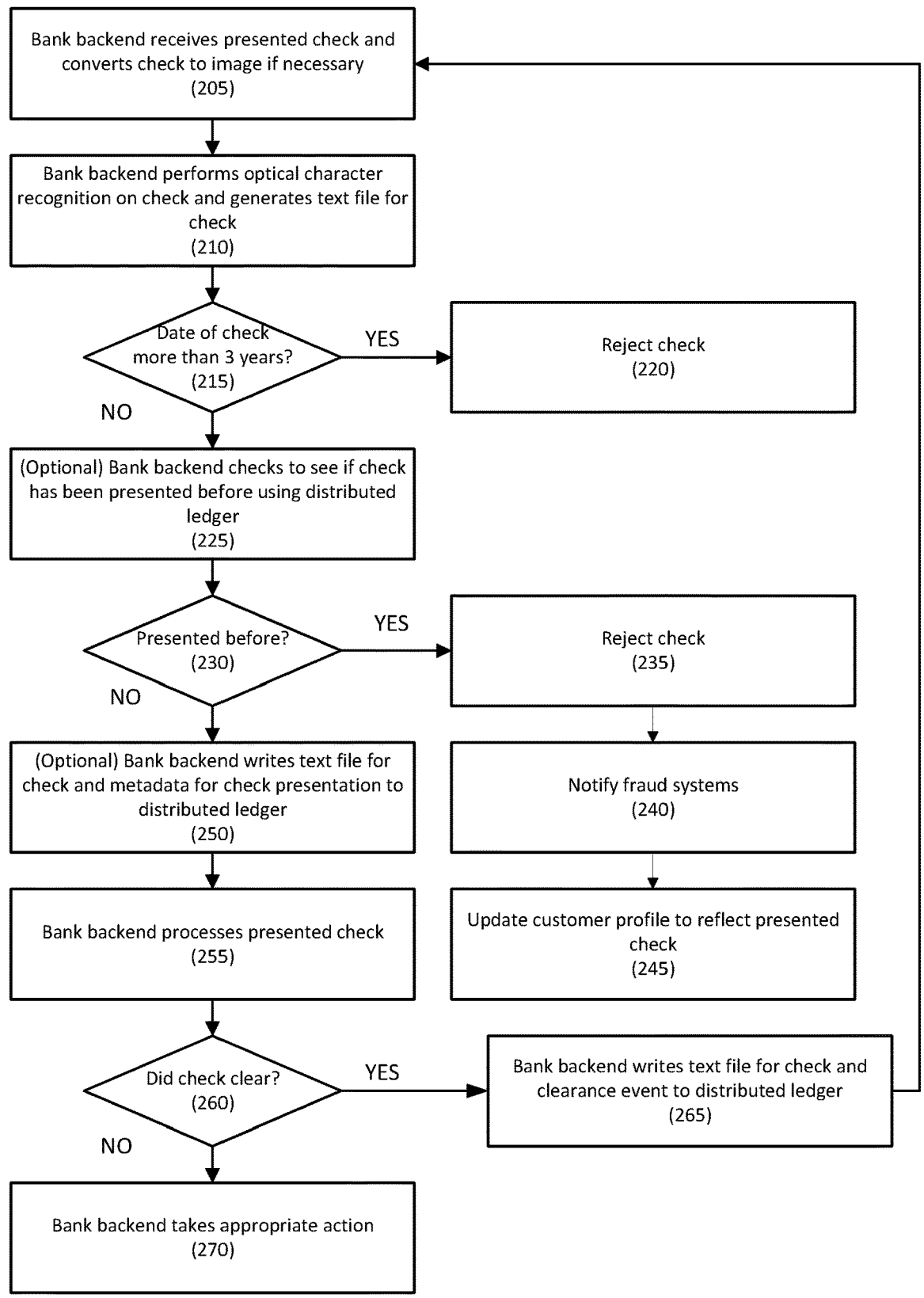
FIG. 2 depicts a method for distributed ledger-based check verification according to one embodiment.

Referring to FIG. 2, a method for distributed ledger-based check verification is disclosed according to one embodiment. In step 205, a bank backend computer program, such as that depicted in FIG. 1, may receive a presented check. The check may be a physical check or an image of a check.

If a paper check is received, the bank backend computer program may convert the check to an image.

In one embodiment, the image of the check may be received as part of an electronic check deposit process from a computer application, such as a mobile banking application, that may be executed by a mobile electronic device, an automated teller machine, a teller workstation, etc. An electronic check deposit process may involve an image of a check.

In step 210, the bank backend computer program may perform optical character recognition on the check image and may generate a text file for the check from the conversion.

In step 215, the bank backend computer program may check that the date of the check is within a certain time period, such as within three years of the current date. The time period may vary based on laws, regulations, policies, etc. as is necessary and/or desired.

If the date of the check is outside of the certain time period, in step 220, the bank backend computer program may reject the check.

If the date of the check is within the certain time period, in optional step 225, the bank backend computer program may check to see if the check has been presented and/or cleared before. For example, the bank backend computer program may query one or more distributed ledgers in a distributed ledger network with check information from the text file, such as the bank routing number, the account number, and the check number. In one embodiment the distributed ledger network may include a plurality of participating financial institutions, and each participating financial institution may submit check information to its copy of the distributed ledger whenever a check is presented and/or cleared.

In one embodiment, a plurality of ledgers may be used to expedite the query. For example, separate ledgers may be provided and may be based on the date of the check (e.g., separate ledgers for year, month, or day), based on the drawee bank, etc. Thus, a participating financial institution may submit a presented and/or cleared check to a specific distributed ledger based on the data, drawee bank, etc. A query may then be run against the appropriate ledger, thereby reducing the amount of searching required.

In another embodiment, the distributed ledger(s) may maintain a hash of data from prior check images, such as the routing number, account number, and check number, may be hashed and the hash may be written to an appropriate distributed ledger. Before the query, the routing number, account number, and the check number may be hashed, and the distributed ledger(s) may be searched for a matching hash. A match indicates that the check has been presented and/or cleared before.

If, in step 230, the bank backend computer program determines that the check was presented and/or cleared before, in step 235, the bank backend computer program may reject the check. In step 240, the bank backend computer program may take additional actions, such as notifying a fraud system that the check has been presented multiple times.

In step 245, the bank backend computer program may update the check presenter's (e.g., the user of the computer application that submitted the electronic check deposit from the electronic device) profile to reflect a cleared check being presented multiple times. For example, if a user presents more than a certain number of cleared checks multiple times, the user may be classified as a "high risk" user, and the bank backend computer program may increase deposit hold times on electronic-deposited checks, may apply increased scrutiny and review on the user's checks, may lower the user's deposit limits, may not make any funds available to the check presenter until the check has cleared, may suspend the user's electronic deposit capabilities, etc.

If the check has not been presented and/or cleared before, in optional step 250, the bank backend computer program may write the text file for the check and metadata for the clearing activity to a check presentation distributed ledger. In one embodiment, the metadata may identify the date of clearance, an identifier for the presenting bank, an identifying for the drawee bank, etc. The bank backend computer program may then present the check image to the drawee bank as per normal procedures.

In another embodiment, the routing number, account number, and the check number may be hashed, and the hash may be written to the appropriate distributed ledger.

In step 255, the bank backend may process the presented check for deposit. This may be a business-as-usual process.

If, in step 260, the check cleared, in step 265, the bank backend computer program may write the text file to check cleared distributed ledger with metadata related to the check clearing (e.g., date and time, drawee bank identifier, etc.).

In one embodiment, the bank backend computer program may write the image of the check to the check cleared distributed ledger. The bank backend computer program may embed a digital watermark in the image with metadata for the clearing activity, such as the date of clearance, an identifier for the presenting bank, an identifying for the drawee bank, etc.

In one embodiment, the image may be written in addition to, or instead of, the text file.

In one embodiment, the check presented distributed ledger and the check cleared distributed ledger may be the same distributed ledger.

If the check did not clear, in step 270, the bank backend computer program may take an appropriate action according to a law, regulation, and/or bank policy.

In one embodiment, the check may include a unique identifier which may be visible or invisible to a human. For example, the unique identifier may be a watermark that may be embedded in the check or in the check image. The unique identifier may include metadata identifying the drawee bank, branch, payor account, etc. Any suitable information may be included as is necessary and/or desired.

In one embodiment, the bank backend computer receiving the presented check may provide the unique identifier to the drawee bank, which may determine whether the check has been presented before.

In one embodiment, the presenting bank may add a digital watermark or digital signature to the image of the check when presenting the check to the drawee bank. The digital watermark or digital signature may include metadata, such as an identification of the presenting bank, a date and time of presentment, an identifier for the payee's account, etc. Any suitable information may be included as is necessary and/or desired.

In one embodiment, the image may be written in addition to, or instead of, the text file.

FIG. 3 depicts an exemplary computing system for implementing aspects of the present disclosure. FIG. 3 depicts exemplary computing device 300. Computing device 300 may represent the system components described herein, including, for example, backend 112. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, these embodiments are not exclusive to each other, and features from one may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention.

Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed ledger-based check verification, comprising:

receiving, by a bank backend computer program and from a computer application executed by an electronic device configured to capture an image of a check, the image of a presented check as part of an electronic check deposit process and a check presenter's profile associated with the presented check;

embedding, by the bank backend computer program, a first metadata of the check in the image of the check as a first watermark, the first metadata comprising a presenting bank identifier;

performing, by the bank backend computer program, optical character recognition on the image of the presented check, the optical character recognition determining check information including a routing number, an account number, and a check number of the presented check;

generating, by the bank backend computer program, a text file based on the optical character recognition, the text file including check information and a second metadata of the check including a date, a time, and a drawee bank identifier, the drawee bank identifier identifying a drawee bank, the drawee bank including a bank that the presented check orders money to be drawn from;

verifying, by the bank backend computer program, that the date is within three years of a current date;

maintaining, by each backend computer program executed by a plurality of processors of a plurality of backend computers, a copy of a plurality of distributed ledgers in a distributed ledger network on each memory of the plurality of backend computers;

determining, by the bank backend computer program, one distributed ledger of the plurality of distributed ledgers in a distributed ledger network to query based on the routing number of the presented check and the date of the presented check, wherein the determined distributed ledger network comprises a plurality of banks including the drawee bank and the presenting bank;

querying, by the bank backend computer program, the determined distributed ledger to determine whether the presented check has been presented and cleared before by determining whether the determined distributed ledger includes a hash that matches a query hash of information of the presented check, wherein the determined distributed ledger comprises a block-chain based distributed ledger;

determining, by the bank backend computer program, that the presented check has not been presented and cleared before based on the determined distributed ledger;

processing, by the bank backend computer program, the presented check for deposit;

generating, by the bank backend computer program, a drawee bank identifier on the image of the check, the drawee bank identifier identifying the drawee bank, the drawee bank being associated with the bank backend computer program that receives the presented check;

presenting, by the bank backend computer program, the image of the presented check to the drawee bank, the image including the drawee bank identifier and the presenting bank identifier;

updating, by the bank backend computer program, the check presenter's profile associated with the presented check to associate with a cleared check being presented based on the clearing activity;

lowering, by the bank backend computer program, a user's profile deposit limit associated with the check presenter's profile based on the clearing activity;

writing, by the bank backend computer program, the text file for the presented check to a check cleared distributed ledger, wherein the text file for the presented check that is written to the check cleared distributed ledger comprises a third metadata identifying clearing activity; and writing, by the bank backend computer program, the image of the presented check to the check cleared distributed ledger with a second watermark, wherein the second watermark comprises the third metadata identifying clearing activity.

2. A method for distributed ledger-based check verification, comprising:

receiving, by a bank backend computer program and from a computer application executed by an electronic device configured to capture an image of a check, the image of a presented check as part of an electronic check deposit process and a check presenter's profile associated with the presented check;

embedding, by the bank backend computer program, a first metadata of the check in the image of the check as a first watermark, the first metadata comprising a presenting bank identifier;

performing, by the bank backend computer program, optical character recognition on the image of the presented check;

generating, by the bank backend computer program, a text file based on the optical character recognition, the text file including check information and a second metadata of the check including a date, a time, and a drawee bank identifier, the drawee bank identifier including an identifier of the drawee bank, the drawee bank identifier identifying a drawee bank, the drawee bank including a bank that the presented check orders money to be drawn from;

verifying, by the bank backend computer program, that the date is within three years of a current date;

maintaining, by each backend computer program executed by a plurality of processors of a plurality of backend computers, a copy of a plurality of distributed ledgers in a distributed ledger network on each memory of the plurality of backend computers;

determining, by the bank backend computer program, one distributed ledger of the plurality of distributed ledgers to query based on the routing number of the presented check and the date of the presented check;

querying, by the bank backend computer program, the determined distributed ledger to determine whether the presented check has been presented and cleared before by determining whether the distributed ledger includes a hash that matches a query hash of information of the presented check, wherein the determined distributed ledger comprises a block-chain based distributed ledger;

determining, by the bank backend computer program, that the presented check has been presented and cleared before;

generating, by the bank backend computer program, a drawee bank identifier on the image of the check, the drawee bank identifier identifying the drawee bank, the drawee bank being associated with the bank backend computer program that receives the presented check;

writing, by the bank backend computer program, the text file and a watermark comprises clearing activity metadata for the presented check to a check presented distributed ledger, presenting, by the bank backend computer program, the image of the presented check to the drawee bank, the image written to the check by the bank backend computer program including the drawee bank identifier and the presenting bank identifier;

rejecting, by the bank backend computer program, the electronic check deposit process;

updating, by the bank backend computer program, a customer profile for the customer associated with the computer application based on the rejection; and restricting, by the bank backend computer program, electronic deposits from the customer profile associated with the computer application based on the rejection.

3. The method of claim 2, wherein the step of rejecting the electronic check deposit process comprises:

notifying, by the bank backend computer program, the computer application of the rejection.

* * * * *